(12) United States Patent
Kondo

(10) Patent No.: US 8,005,047 B2
(45) Date of Patent: Aug. 23, 2011

(54) HANDOVER METHOD IN CODE DIVISION MULTIPLE ACCESS COMMUNICATION SYSTEM AND SYSTEM THEREOF

(75) Inventor: Seiji Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 2719 days.

(21) Appl. No.: 10/241,680

(22) Filed: Sep. 12, 2002

(65) Prior Publication Data

US 2003/0048763 A1  Mar. 13, 2003

(30) Foreign Application Priority Data

Sep. 13, 2001  (JP) ................................. 2001-277507

(51) Int. Cl.
*H04W 4/00* (2009.01)
(52) U.S. Cl. .......................... 370/331; 370/335; 370/342
(58) Field of Classification Search .......... 370/331–335, 370/342, 336; 375/130, 140, 146, 147, 149, 375/141, 295; 455/436–440, 442–443, 426.1
See application file for complete search history.

(56) References Cited

U.S. PATENT DOCUMENTS

| | | | | |
|---|---|---|---|---|
| 5,345,467 A * | 9/1994 | Lomp et al. | .................... | 370/331 |
| 5,673,260 A * | 9/1997 | Umeda et al. | ................. | 370/342 |
| 5,937,019 A * | 8/1999 | Padovani | ....................... | 375/358 |
| 5,956,641 A * | 9/1999 | Bruckert et al. | .............. | 455/442 |
| 6,061,338 A * | 5/2000 | O | .................................. | 370/335 |
| 6,216,004 B1 * | 4/2001 | Tiedemann et al. | .......... | 455/442 |
| 6,229,796 B1 * | 5/2001 | Dent | .............................. | 370/335 |
| 6,289,007 B1 * | 9/2001 | Kim et al. | ....................... | 370/331 |
| 6,707,842 B2 * | 3/2004 | Rick et al. | ....................... | 375/142 |
| 6,721,566 B2 * | 4/2004 | Longoni et al. | ............... | 455/436 |
| 6,747,965 B1 * | 6/2004 | Nara et al. | ...................... | 370/335 |
| 6,873,612 B1 * | 3/2005 | Steer et al. | ...................... | 370/342 |
| 7,190,685 B2 * | 3/2007 | Das et al. | ........................ | 370/336 |
| 7,295,536 B2 * | 11/2007 | Refai et al. | ..................... | 370/331 |
| 2002/0077138 A1 * | 6/2002 | Bark et al. | ..................... | 455/522 |
| 2002/0187780 A1 * | 12/2002 | Souissi | ......................... | 455/426 |

FOREIGN PATENT DOCUMENTS

| | | |
|---|---|---|
| EP | 1 102 506 A1 | 5/2001 |
| EP | 1 191 712 A2 | 3/2002 |
| GB | 2 358 326 A | 7/2001 |
| JP | 9-307943 A | 11/1997 |
| JP | H10-308979 A | 11/1998 |
| JP | H11-27716 A | 1/1999 |
| JP | 11-355831 A | 12/1999 |
| JP | 2000-83274 A | 3/2000 |
| JP | 2001-128213 A | 5/2001 |
| WO | WO 00/30390 A1 | 5/2000 |

* cited by examiner

*Primary Examiner* — Hassan Kizou
*Assistant Examiner* — Toan D Nguyen
(74) *Attorney, Agent, or Firm* — Sughrue Mion, PLLC

(57) ABSTRACT

In a code division multiple access mobile communication system, a common conversation channel capable of sending the information necessary for handover to a mobile device is provided in a downlink, and in case that the mobile device moves from an area of one radio base station to an area of other radio base station, the information necessary for the handover is transmitted by way of the common conversation channel.

14 Claims, 7 Drawing Sheets

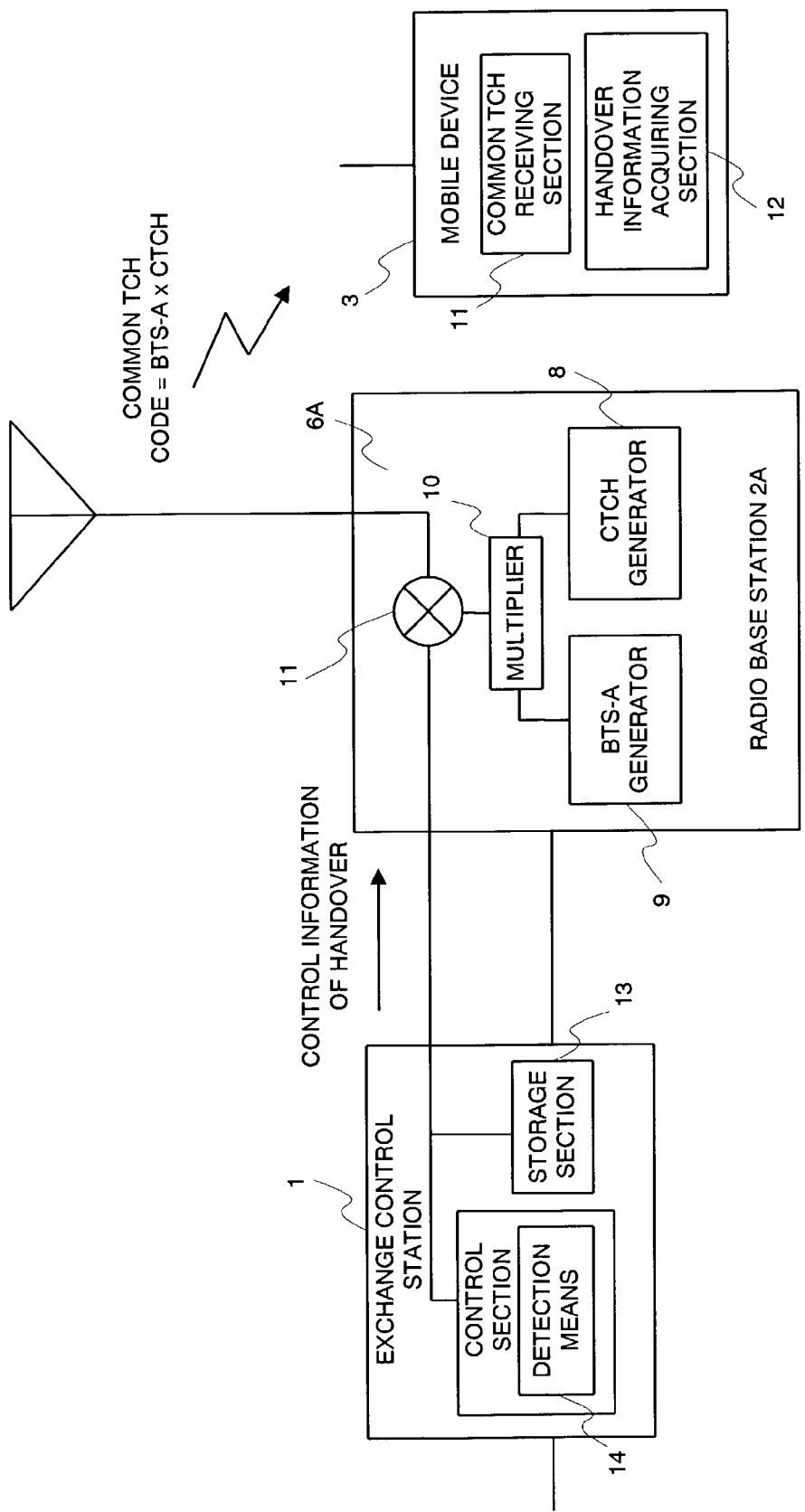

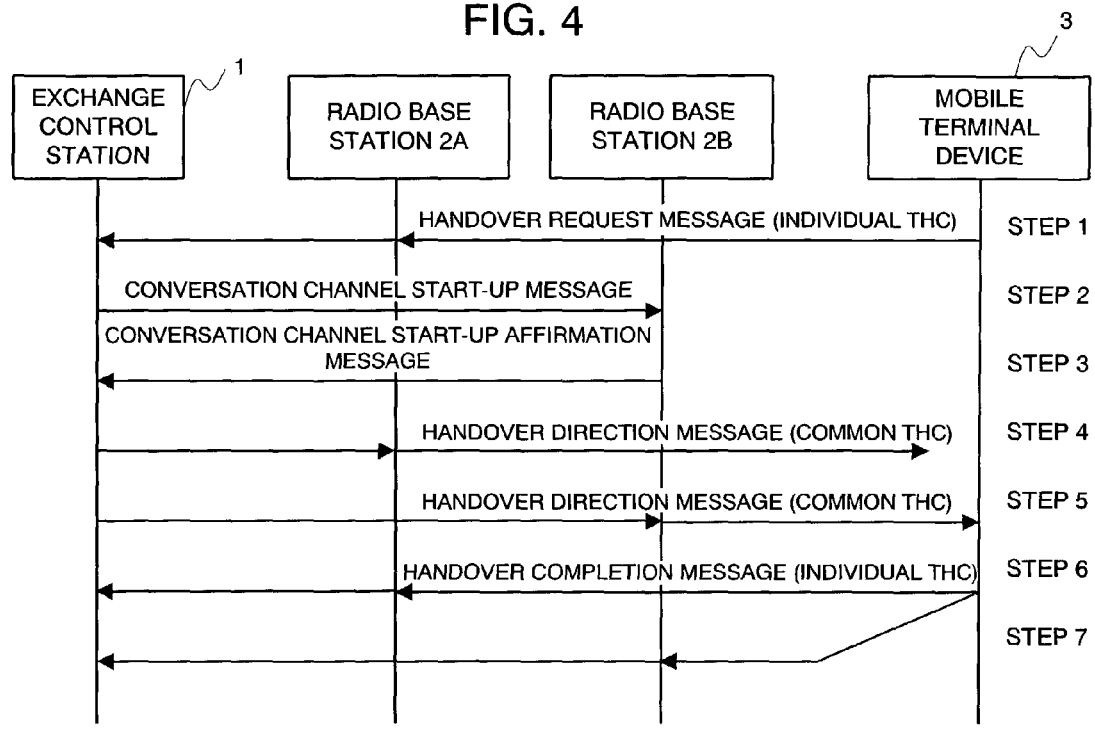
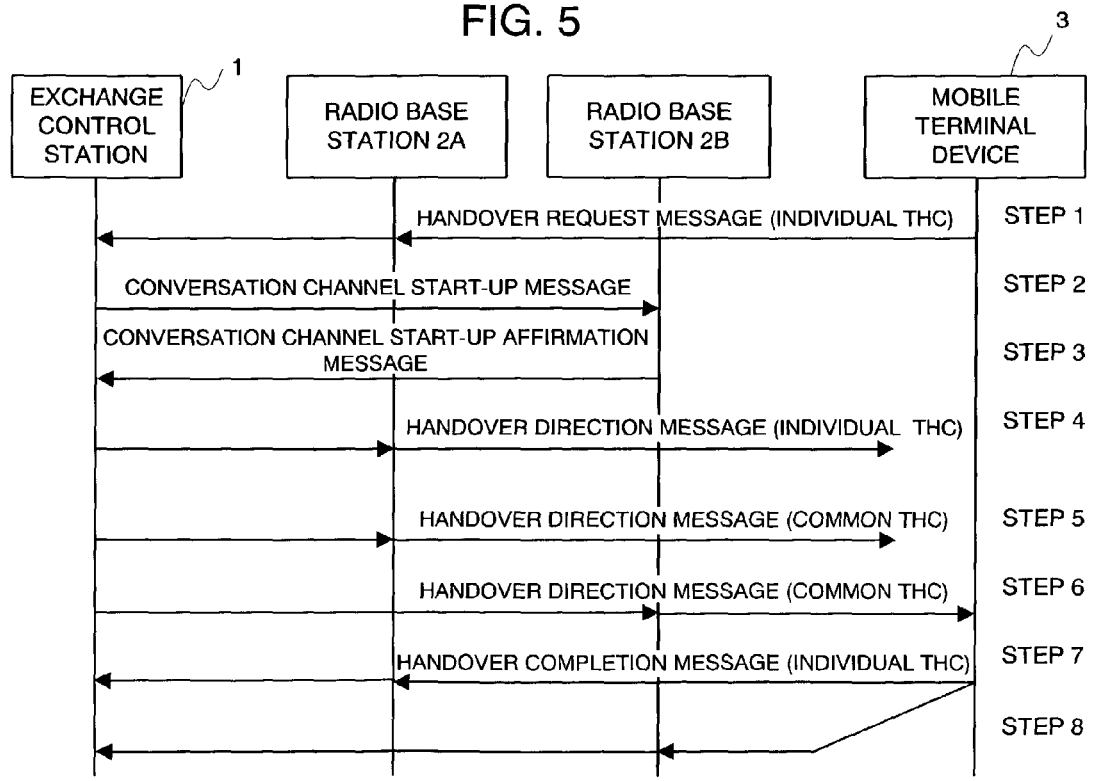

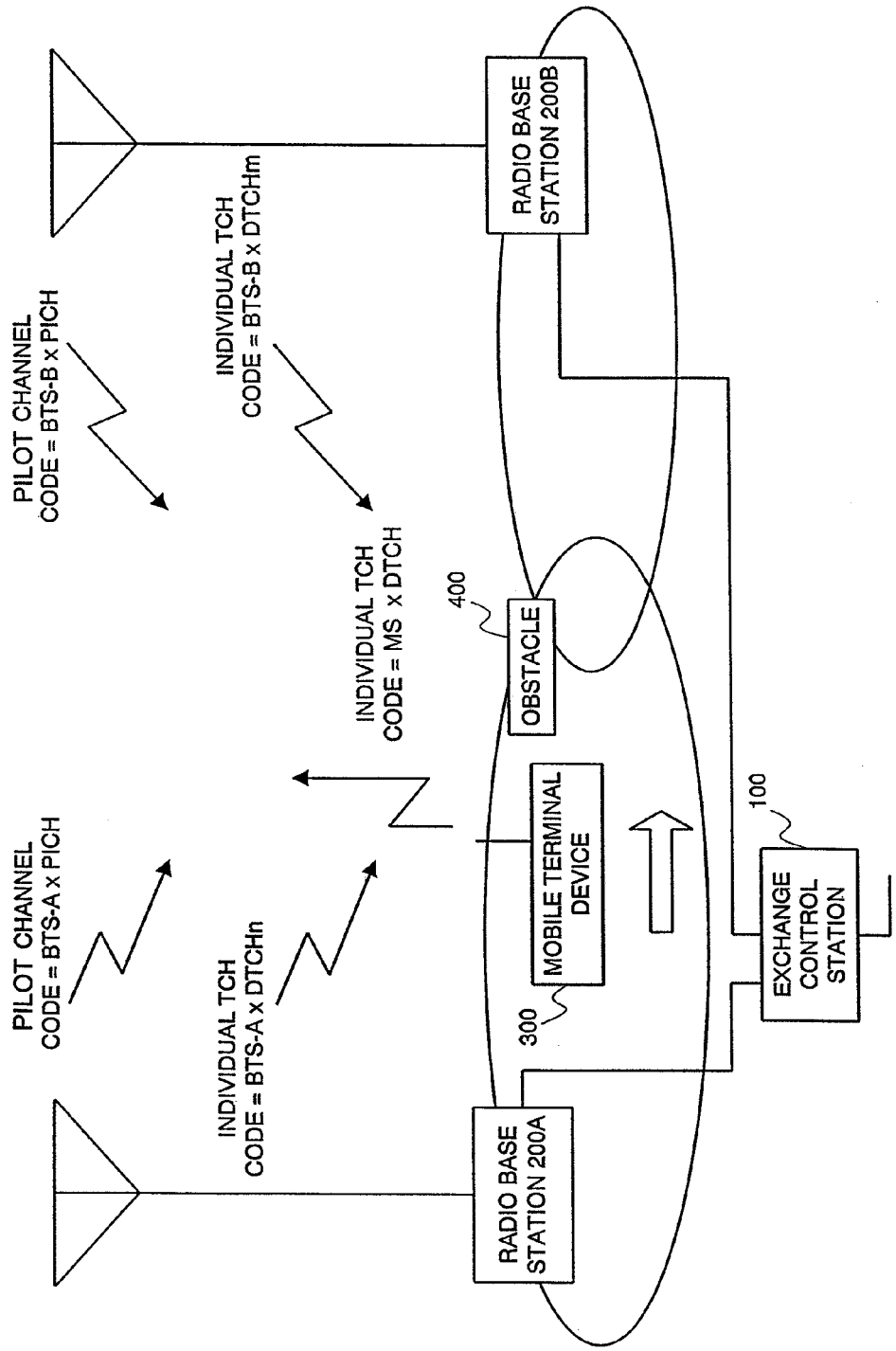

HANDOVER METHOD IN CODE DIVISION MULTIPLE ACCESS COMMUNICATION SYSTEM AND SYSTEM THEREOF

BACKGROUND OF THE INVENTION

The present invention relates to a code division multiple access mobile communication method and a system thereof, and especially, to a technology of handover.

In a mobile communication system, various kinds of multiple access techniques are adopted. A code division multiple access (referred to as CDMA hereinafter) mobile communication system that is one of them uses the same carrier frequency in all areas, and however, in order to discriminate areas covered by respective radio base stations from each other, a peculiar spreading code is allocated to every radio base station.

In this CDMA mobile communication technique, first, a mobile terminal device searches cell discriminating signals being transmitted from the radio base stations, and selects a radio base station having the strongest electric field strength of a radio wave.

Next, in case that conversation is conducted by the mobile terminal device, transmission and reception of a control channel signal such as a dial signal and a termination response signal are conducted by a control channel of the selected radio base station, and after it is conformed at an exchange control station that the above-described mobile terminal device can provide service, voice channels for the conversation are allocated.

By the way, even in case that, after the conversation is started by the mobile terminal device, a user (mobile terminal) moves from an area covered by the initial radio base station to an area covered by other radio base station, a handover method is adopted for preventing the conversation from being broken.

With regard to a technology in relation to this handover method, several methods have been proposed.

For example, in a mobile communication technique described in JP-P1997-307943A, in order to reduce a time period and increase a success rate of handover, a method has been proposed, in which a radio base station during conversation and an adjacent radio base station are caused to be a plurality of conference conversations in advance, and a handover reservation is made.

Also, with regard to a hand-off method to a different communication technique cellular system base station in a CDMA cellular system and a cellular system described in JP-P1999-355831A, in a mobile communication system in which a cellular system having a technique different from the CDMA cellular system is intermixed, and service is provided, when the reception electric field strength of a pilot signal transmitted from a radio base station exceeds a pre-set level, a mobile device being communicating with a CDMA cellular system radio base station measures this and makes a report. The reception electric field strength of this pilot signal is compared with the reception electric field strength of a signal transmitted from an adjacent radio base station of the other CDMA technique cellular system under a relationship condition. And, a proposal has been made, wherein, in case that this comparison result coincides with a preset condition most suitable for applying hand-off to a cellular system radio base station of a different technique, hand-off processing to the different technique cellular system radio base station is executed.

Also, in a CDMA mobile communication technique described in JP-P1999-262043A, a proposal has been made, wherein an exchange control station receives a dial signal or a termination response signal from a mobile device by way of a radio base station, and when it is determined based on adjacent cell electric field strength information that the mobile device exists in a boundary region of an adjacent cell, it transmits use control channel information of the radio base station to a radio base station of the adjacent cell, and the radio base station of the adjacent cell starts up a control channel in accordance with the control channel information, and the exchange control station transmits down-control channel signals to the mobile device and a radio base station adjacent to the radio base station during the transmission, respectively, and at the radio base station and the radio base station of the adjacent cell, signal quality during reception is added to an up-control channel signal from the mobile station and is transmitted to the exchange control station, and the exchange control station selects an up-control channel signal based on the received up-control channel signal and its signal quality.

Here, a general handover method will be explained.

FIG. 6 is a system configuration view for establishing a handover method in a conventional CDMA mobile communication technique.

FIG. 7 is a sequence view of a conventional handover method.

A conventional CDMA mobile communication system has an exchange control station 100, radio base stations 200A and 200B, and a mobile terminal device 300. The exchange control station 100 is a control station for conducting call processing control, radio/wire circuit control and member administration. The radio base stations 200A and 200B transmit and receive signals by using a radio wave diffused by a spreading code mentioned later for conducting communication with the mobile terminal device 300.

Next, a channel to be transmitted from the radio base stations 200A and 200B or the mobile terminal device 300 will be explained.

A pilot channel is a channel that is set by transmitting radio waves diffused by a spreading code from the respective radio base stations 200A and 200B so that an optimum area for the communication of the mobile device 300 can be selected. The spreading code of this channel is a product of codes BTS-k and a code PICH representing the pilot channel.

In the conventional CDMA mobile communication system, since the same carrier frequency is used for the communication between all of the radio base stations 200A and 200B and the mobile terminal device 300, it is necessary to allocate spreading codes different from each other for each of the radio base stations 200A and 200B so that the mobile terminal device 300 can discriminate the radio base stations 200A and 200B from each other. In FIG. 6, a spreading code BTS-A is allocated to the radio base station 200A, and a spreading code BTS-B is allocated to the radio base station 200B. In addition, the code PICH is the same as in all of radio areas.

The mobile terminal device 300 measures the electric field strength of pilot channels from the plurality of adjacent radio base stations 200A and 200B, and selects one radio base station most suitable for communication, for example, the radio base station 200A. The mobile terminal device 300 during conversation newly receives a pilot channel of a radio base station other than the selected radio base station 200A, and when the electric field strength of this newly received pilot channel exceeds a threshold value for staring up handover, it transmits a handover request message to the exchange control station 100.

An individual TCH is a channel for transmitting a voice signal and information or the like of an adjacent radio area between the mobile device 300 and the exchange control station 100. Since the plurality of mobile devices 300 are connected to one of the radio base stations 200A and 200B, a plurality of individual TCHs are prepared in the radio base stations 200A and 200B. A spreading code of the individual TCHs from these radio base stations 200A and 200B to the mobile terminal device 300 is a product of the codes BTS-k and codes DTCHn (Any value of 1, 2, 3, . . . is allocated to n. Same hereinafter.) that are different from each other for every mobile terminal device 300 within a radio area or a product of the codes BTS-k and codes DTCHm (Any value of 1, 2, 3, . . . is allocated to m. Same hereinafter.).

Also, the spreading codes of the individual TCH from the mobile terminal device 300 to the radio base stations 200A and 200B are codes MSj (Any value of 1, 2, 3, . . . is allocated to j. Same hereinafter.) that are different from each other for every mobile terminal device 300.

Next, how handover is conducted in the conventional CDMA mobile communication system configured above will be explained particularly.

In case that the mobile terminal device 300 relaying the radio base station 200A and communicating with the exchange control station 100 is moving towards the radio base station 200B, when it enters an area of a radio wave of the radio base station 200B, the electric field strength of a radio wave of a pilot channel originated from the radio base station 200B exceeds a threshold value for starting up handover.

If it exceeds this threshold value, the mobile terminal device 300 transmits a handover request message to the exchange control station 100 by means of the individual TCH (FIG. 7, step 1).

The exchange control station 100 that received the handover request message transmits a conversation channel start-up message to the radio base station 200B for starting up the individual TCH of the radio base station 200B (FIG. 7, step 2).

The radio base station 200B that received the conversation channel start-up message issues a conversation channel start-up affirmation message for notifying the exchange control station 100 of the spreading codes DTCHm to be newly used (FIG. 7, step 3).

For indicating to the mobile device 300 the spreading codes DTCHm to be used in the radio base station 200B that is a handover destination, the exchange control station 100 that received the conversation channel start-up affirmation message transmits a handover direction message to the mobile terminal device 300 using the individual TCH of the radio base station 200A that is a handover source (FIG. 7, step 4).

The mobile device 300 that received the handover request message issues a handover completion message by means of the individual TCH (FIG. 7, step 5, step 6). And, the exchange control station 100 receives the handover completion message, and thereby, the control of the handover ends.

However, due to an obstacle or the like between the radio base station 200A and the radio base station 200B, there is a case where the mobile terminal 300 cannot receive the handover direction message from the individual TCH of the radio base station 200A that is a handover source.

Below, circumstances will be explained in detail by using FIG. 8.

First, in case that the mobile terminal device 300 relaying the radio base station 200A and communicating with the exchange control station 100 is moving towards the radio base station 200B, when it comes from behind an obstacle 400, the electric field strength of a radio wave of a pilot channel originated from the radio base station 200B exceeds a threshold value for starting up handover. For example, a case where it comes from behind a building at a crossing and the radio base station 200B becomes to be seen corresponds to this.

If it exceeds this threshold value, the mobile terminal device 300 transmits a handover request message to the exchange control station 100 by means of an individual conversation channel (referred to as an individual TCH, hereinafter) (FIG. 8, step 1).

The exchange control station 100 that received the handover request message transmits a conversation channel start-up message to the radio base station 200B for starting up the individual TCH of the radio base station 200B (FIG. 8, step 2).

The radio base station 200B that received the conversation channel start-up message issues a conversation channel start-up affirmation message for notifying the exchange control station 100 of the spreading codes DTCHm that can be newly used (FIG. 8, step 3).

For indicating the spreading codes DTCHm to be used in the radio base station 200B that is a handover destination, the exchange control station 100 that received the conversation channel start-up affirmation message transmits a handover direction message to the mobile terminal device 300 using the individual TCH (the channel that is being used for the communication with the mobile terminal device 300) of the radio base station 200A that is a handover source (FIG. 8, step 4).

However, the mobile terminal device 300 that has come from behind the obstacle 400 cannot receive a signal from the radio base station 200A, since the electric field strength of a radio wave originated from the radio base station 200B is stronger than the electric field strength of a radio wave originated from the radio base station 200A.

Accordingly, the handover from the radio base station 200A to the radio base station 200B fails, and the connection is cut off.

In this manner, it is a phenomenon of the CDMA mobile communication technique in which the same carrier frequency is used that, when the electric field strength of a radio wave originated from the radio base station 200B abruptly becomes stronger than the electric field strength of a radio wave originated from the radio base station 200A, the mobile terminal device 300 cannot receive a signal being transmitted from the radio base station 200A, of which electric field strength of the radio wave is weaker. In addition, although a case where the obstacle 400 exists was explained above, the similar phenomenon also occurs in a case where a phasing phenomenon is caused in a radio wave from the radio base station 200A, and it abruptly becomes weaker than the electric filed strength of a radio wave originated from the radio base station 200B.

SUMMARY OF THE INVENTION

The present invention has been made in the light of the above-described tasks, and the objective thereof is to provide a CDMA mobile communication system and a method thereof capable of increasing a success rate of handover even under circumstances such that the electric field strength of a radio wave originated from a radio base station that is a handover source abruptly becomes weaker than the electric field strength of a radio wave originated from a radio base station that is a handover destination due to the influence of an obstacle or the like.

The first invention for accomplishing the above-described objective is a handover method in a code division multiple access communication system, characterized in that control information of handover is transmitted by using an exclusive channel provided in a downlink.

The second invention for accomplishing the above-described objective is a handover method in a code division multiple access communication system, characterized in that control information of handover is transmitted by using a common channel generated by means of a spreading code that is a product of a code inherent in every radio base station and a code common to all radio base stations.

Also, the third invention for accomplishing the above-described objective is, in the above-described first invention, characterized in that the control information of handover is transmitted by using a common channel generated by means of a spreading code that is a product of a code inherent in a radio base station of a handover source and a code common to all radio base stations, and a common channel generated by means of a spreading code that is a product of a code inherent in a radio base station of a handover destination and a code common to all radio base stations.

Also, the fourth invention for accomplishing the above-described objective is, in the above-described second or third invention, characterized in that a frame comprising a mobile terminal discriminating information section for discriminating mobile terminals from each other and a data section for a mobile terminal specified by this mobile terminal discriminating information is transmitted to the common channel.

Also, the fifth invention for accomplishing the above-described objective is, in any invention of the above-described second to fourth, characterized in that the control information of handover is transmitted by using the common channel only in case that there is no response from the mobile terminal to control information of handover, which was transmitted from an individual communication channel.

Also, the sixth invention for accomplishing the above-described objective is, in any invention of the above-described third to fifth, characterized in that a code inherent in an adjacent radio base station is transmitted by a report channel to a mobile terminal which is not communicating.

Also, the seventh invention for accomplishing the above-described objective is, in any invention of the above-described third to fifth, characterized in that a code inherent in an adjacent radio base station is transmitted by an individual communication channel.

Also, the eighth invention for accomplishing the above-described objective is a handover method in a code division multiple access communication system, characterized in that the method has steps of:

in response to handover from a mobile terminal, generating handover control information comprising mobile terminal discriminating information for discriminating said mobile terminal and a data necessary for the handover of said mobile terminal;

transmitting control information of said handover by using a common channel generated by means of a spreading code that is a product of a code inherent in a radio base station of a handover source and a code common to all radio base stations, and a common channel generated by means of a spreading code that is a product of a code inherent in a radio base station of a handover destination and a code common to all radio base stations;

receiving handover control information from said common channel by means of a spreading code that is a product of a code inherent in an adjacent radio base station, which was acquired from other channel, and a code common to all radio base stations, which is stored in advance, and acquiring handover control information having mobile terminal discriminating information of its own mobile terminal out of the received handover control information; and transmitting received information of the handover control information to the radio base station of the handover source and/or the radio base station of the handover destination by using an individual communication channel.

Also, the ninth invention for accomplishing the above-described objective is, in the above-described eighth invention, characterized in that the control information of handover is transmitted by using the common channel only in case that there is no response from the mobile terminal to control information of handover, which was transmitted from an individual communication channel.

Also, the tenth invention for accomplishing the above-described objective is, in the above-described eighth or ninth invention, characterized in that a code inherent in an adjacent radio base station is transmitted by a report channel to a mobile terminal which is not communicating.

Also, the eleventh invention for accomplishing the above-described objective is, in any invention of the above-described eighth to tenth, characterized in that a code inherent in an adjacent radio base station is transmitted by an individual communication channel.

Also, the twelfth invention for accomplishing the above-described objective is a code division multiple access communication system, characterized in that the system has:

means for, in response to handover from a mobile terminal, generating handover control information comprising mobile terminal discriminating information for discriminating said mobile terminal and a data necessary for the handover of said mobile terminal; and means for diffusing said handover control information by means of a spreading code that is a product of a code inherent in every radio base station and a code common to all radio base stations, and transmitting this diffused handover control information by means of a common channel specified by said spreading code.

Also, the thirteenth invention for accomplishing the above-described objective is, in the above-described twelfth invention, characterized in that the system has:

means for transmitting the control information of handover by means of an individual communication channel; and means for transmitting the control information of handover by using said common channel only in case that there is no response from the mobile terminal to control information of handover, which was transmitted from said individual communication channel.

Also, the fourteenth invention for accomplishing the above-described objective is a code division multiple access communication system, characterized in that the system has:

an exchange station having means for, in response to handover from a mobile terminal, generating handover control information comprising mobile terminal discriminating information for discriminating said mobile terminal and a data necessary for the handover of said mobile terminal;

a radio base station of a handover source, which has means for transmitting the control information of said handover by using a common channel generated by means of a spreading code that is a product of a code inherent in its own radio base station and a code common to all radio base stations;

a radio base station of a handover destination, which has means for transmitting the control information of said handover by using a common channel generated by means of a spreading code that is a product of a code inherent in its own radio base station and a code common to all radio base stations;

means for receiving handover control information from said common channel by means of a spreading code that is a product of a code inherent in an adjacent radio base station, which was acquired from other channel, and a code common to all radio base stations, which is stored in advance, and acquiring handover control information having mobile terminal discriminating information of its own mobile terminal out of the received handover control information; and a mobile terminal having means for transmitting received information of the handover control information to the radio base station of the handover source and/or the radio base station of the handover destination by using an individual communication channel.

Also, the fifteenth invention for accomplishing the above-described objective is, in the above-described fourteenth invention, characterized in that the exchange station has means for transmitting the control information of handover by using the common channel only in case that there is no response from the mobile terminal to control information of handover, which was transmitted from an individual communication channel of the handover source.

Also, the sixteenth invention for accomplishing the above-described objective is, in the above-described fourteenth or fifteenth invention, characterized in that the system has means for transmitting a code inherent in a radio base station to a mobile terminal which is not communicating.

Also, the seventeenth invention for accomplishing the above-described objective is, in the above-described fourteenth or fifteenth invention, characterized in that the system has means for transmitting a code inherent in a radio base station by means of an individual communication channel.

If a feature of the above-mentioned present invention is explained using FIG. 1, a common TCH that is an exclusive channel for sending a message for handover control to a down-radio circuit is provided. This common TCH is diffused by a spreading code generated as a result of a product of spreading codes BTS_k (k: A, B, C, . . . ) and a spreading code CTCH. The spreading codes BTS_k (k: A, B, C, . . . ) allocate different spreading codes to every radio base station so that a mobile terminal can discriminate the radio base stations from each other. On the other hand, the spreading code CTCH allocates the same spreading code to all of the radio base stations.

Spreading codes BTS_k (k: A, B, C, . . . ) of an adjacent area can be notified to the terminal device during communication. For example, a voice signal being transmitted from the radio base station 2A is multiplexed by using an individual TCH, and the information of a spreading code BTS_B of a radio base station 2B in an adjacent area can be notified to the mobile terminal 3 relaying the radio base station 2A and communicating with an exchange base station 1. In this manner, it is general in a cellular system to notify the terminal device during communication of the information of an adjacent area. Also, since the same spreading code is allocated to all base station radio devices, the spreading code CTCH can be easily understood by the terminal device.

By using the common TCH diffused by such spreading codes, and indicating spreading codes BTS_k×DTCHm (k: A, B, C, . . . ) (m: 1, 2, 3, . . . ) of the individual TCH to be used at a handover destination, in case that the mobile terminal 3 relaying the radio base station 2A and during communication with the exchange control station 1 comes from the obstacle 4, due to a signal from the radio base station 2B that does not relay communication, even though a signal from the radio base station 2A that has been relaying communication so far cannot be received, since a signal of the common TCH from the radio base station 2B can be received, the handover can be completed normally.

BRIEF DESCRIPTION OF THE DRAWINGS

This and other objects, features and advantages of the present invention will become more apparent upon a reading of the following detailed description and drawings, in which:

FIG. 3 is a block diagram of this embodiment, FIG. 4 is a sequence view showing an operation of handover in this embodiment, FIG. 5 is a sequence view showing an operation of handover in another embodiment, FIG. 6 is a view for explaining a prior art.

DESCRIPTION OF THE EMBODIMENTS

Embodiments of the present invention will be explained.

Figure 1:
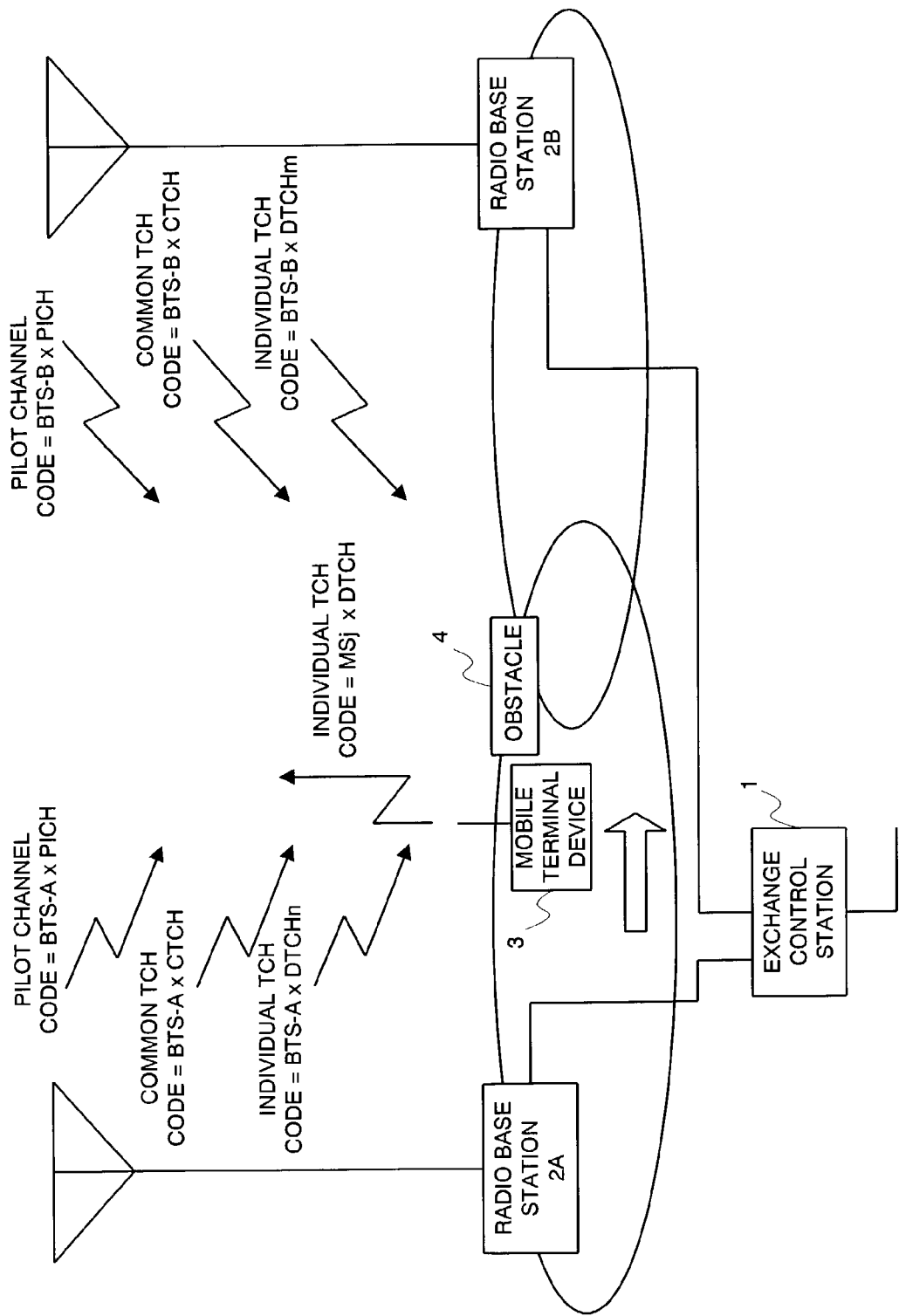
FIG. 1 is a conceptual view for explaining a handover method of a cellular system in a code division multiple access communication technique (simply referred to as a CDMA communication technique, hereinafter) of the present invention.

FIG. 1 is a conceptual view for explaining a handover method of a cellular system in a code division multiple access communication technique (simply referred to as a CDMA communication technique, hereinafter) of the present invention.

In FIG. 1, 1 is an exchange control station, 2A and 2B are radio base stations, 3 is a mobile terminal device, and 4 is an obstacle that exists between the radio base station 2A and the radio base station 2B.

In a cellular system of a general CDMA communication system, to which the present invention is applied, a plurality of radio base stations (In FIG. 1, only the radio base stations 2A and 2B are shown.) are placed in every area, and it is a system in which the exchange control station 1 communicates with a plurality of mobile terminal devices (In FIG. 1, only the mobile terminal device 3 is shown.) while relaying the respective radio base stations.

A pilot channel (simply referred to as a Pilot CH, hereinafter) shown in FIG. 1 is always transmitted from the respective radio base stations 2A and 2B so that the mobile terminal device 3 can select an area most suitable for communication. A spreading code of this Pilot CH is a product of spreading codes BTS_k (k: A, B, C, . . . ) and a spreading code PICH.

In the CDMA technique cellular system, since the same carrier frequency is used for the communication between all radio base stations and mobile terminal devices, it is necessary to allocate different spreading codes to every radio base station so that the mobile terminal device can discriminate the radio base stations from each other. Accordingly, in this embodiment, a spreading code BTS_A is allocated to the radio base station 2A, and a spreading code BTS_B is allocated to the radio base station 2B. In addition, the spreading codes BTS_k (k: A, B, C, . . . ) are used as spreading codes for discriminating the radio base stations also in a common conversation channel and an individual conversation channel mentioned later. Also, the spreading code PICH is a spreading code to be used in common in all areas.

And, the mobile terminal device 3 receives from an adjacent radio base station the Pilot CH generated by a spreading code that is a product of the above-mentioned spreading codes BTS_k (k: A, B, C, . . . ) determined for every area and the spreading code PICH same as in all areas, and measures the electric field strength of the received Pilot CH. And, when the electric field strength of the Pilot CH exceeds a threshold value TA for starting up handover, the mobile terminal device 3 transmits a message for requesting handover (Handover Request Message) to the exchange control station 1. In addition, with regard to the discrimination of the radio base station of the received Pilot CH, since, as mentioned above, the spreading code of the Pilot CH is a product of the spreading codes BTS_k (k: A, B, C, . . . ) and the spreading code PICH, the discrimination becomes possible due to the spreading codes BTS_k (k: A, B, C, . . . ) allocated to every radio base station as different spreading codes.

An individual communication channel (simply referred to as an individual TCH, hereinafter) is a channel for transmitting a voice signal and information or the like of an adjacent area between the mobile terminal device 3 and the exchange control station 1 via the radio base station. However, since a plurality of mobile terminal devices are connected to one radio base station by means of radio, it is necessary to prepare a plurality of individual TCHs for the radio base station. Accordingly, in this embodiment, for a spreading code of a down-direction (down-link) of the individual TCHS, a product of the spreading codes BTS_k and spreading codes DTCHn (n: 1, 2, 3, . . . ) or spreading codes DTCHm (m: 1, 2, 3, . . . ) which are different from each other for every mobile terminal device within an area is used. Also, for a spreading code of an up-direction (up-link) of the individual TCHS, a product of spreading codes MSj (j: 1, 2, 3, . . . ) which are different from each other for every mobile terminal device of a cellular system and the above-mentioned spreading codes DTCHn (n: 1, 2, 3, . . . ) or spreading codes DTCHm (m: 1, 2, 3, . . . ) is used.

A common conversation channel (referred to as a common TCH, hereinafter) is a channel for establishing a handover method of the cellular system in the CDMA technique of the present invention. This common TCH is a channel for transmitting handover control information (Handover Direction Message) such as a message for allocating to the mobile terminal device 3 the spreading codes DTCHn (n: 1, 2, 3, . . . ) or the spreading codes DTCHm (m: 1, 2, 3, . . . ) of the individual TCH, which are used at a handover destination. And, the spreading codes of the common TCH are a product of the spreading codes BTS_k (k: A, B, C, . . . ) allocated to every radio base station and the same spreading code CTCH to be used in all of the radio base stations.

Here, a method in which the mobile terminal device 3 understands the spreading codes of the common TCH will be explained.

Out of the spreading codes for generating the common TCH, that is, the spreading codes BTS_k (k: A, B, C, . . . ) and the spreading code CTCH, since the spreading code CTCH is the same as in all of the radio base stations, it can be stored in the mobile terminal device 3 in advance. Accordingly, with regard to the spreading code CTCH, the mobile terminal device 3 can easily understand the spreading code CTCH by reading it stored therein.

On the other hand, with regard to the spreading codes BTS_k (k: A, B, C, . . . ), these spreading codes BTS_k (k: A, B, C, . . . ) are spreading codes allocated to every radio base station. Accordingly, it is necessary to report the spreading codes BTS_k (k: A, B, C, . . . ) to the mobile terminal device 3 by means of some method. For that, the spreading codes BTS_k (k: A, B, C, . . . ) are reported to the mobile terminal device 3 by means of the following two channels:

1. Report Channel

By means of a report channel, the information of the spreading codes BTS_k (k: A, B, C, . . . ) of an adjacent radio base station is reported from the radio base station to the mobile terminal device that is not communicating.

2. Individual TCH

By means of the individual TCH, the information of the spreading codes BTS_k (k: A, B, C, . . . ) of an adjacent radio base station is reported to the mobile terminal device during communication with the radio base station. In addition, at this time, the information of the spreading codes BTS_k (k: A, B, C, . . . ) of the adjacent radio base station is reported together with a hand-off direction message (Handover Direction Message) that is a message of an individual traffic channel.

If the spreading codes BTS_k (k: A, B, C, . . . ) can be understood by means of the above-described channels, the mobile terminal device 3 can easily understand the spreading codes of the common TCH. For example, it can be understood by reverse-diffusing a signal received as codes generated by multiplying the code TCH by the spreading codes BTS_k (k: A, B, C, . . . ) of the radio base stations 2A, 2B, . . . of adjacent radio areas, which were notified in advance. Since the radio base stations 2A, 2B, . . . of the adjacent radio areas are several stations, it is possible to understand that the received signal is the common TCH by conducting the reverse-spreading several times in order.

Figure 2:
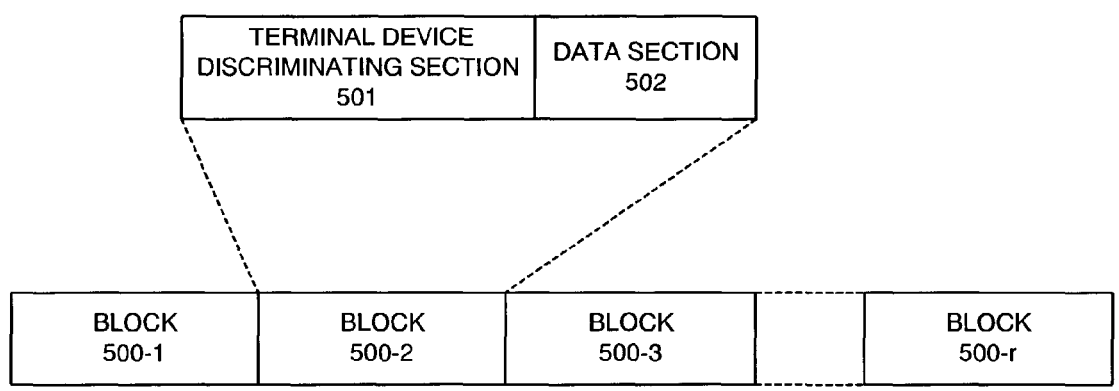
FIG. 2 is a view for explaining a frame format of control information of handover, which is transmitted via a common conversation channel.
Figure 7:
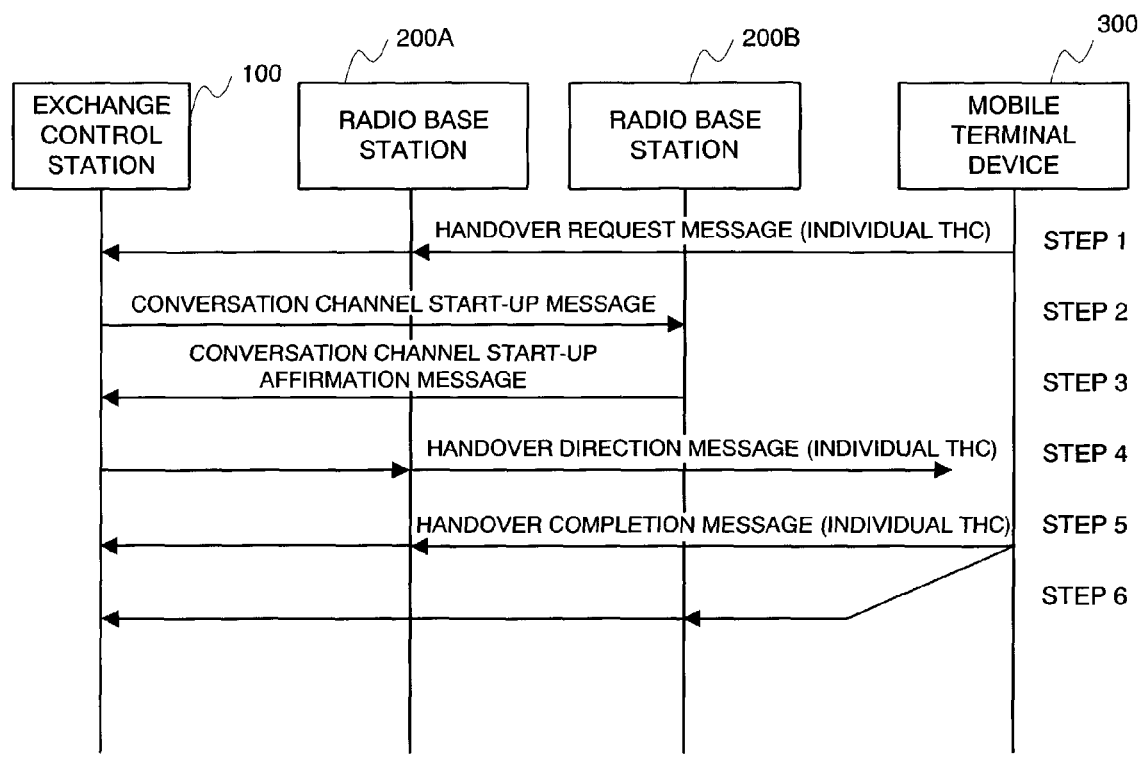
FIG. 7 is a view for explaining a prior art and FIG. 8 is a view for explaining a prior art.
Figure 8:
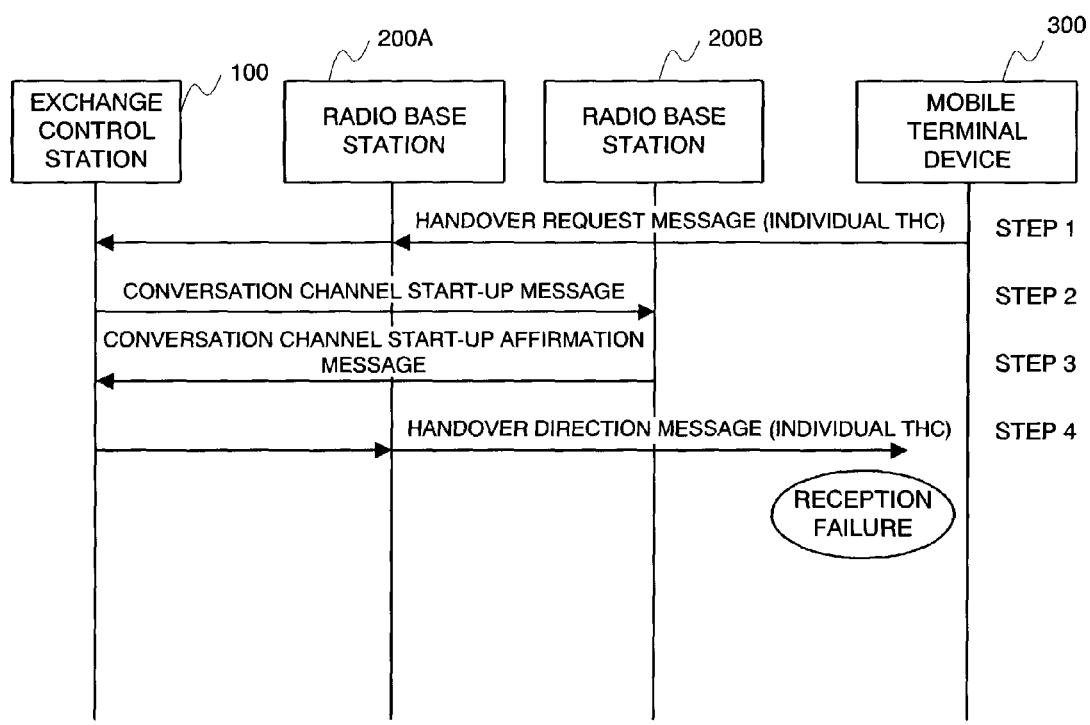

Now, although, as mentioned above, the common TCH is a channel for transmitting the message (Handover Direction Message) for allocating to the mobile terminal device 3 the spreading codes DTCHn (n: 1, 2, 3, . . . ) or the spreading codes DTCHm (m: 1, 2, 3, . . . ) of the individual TCH, which are used at a handover destination, different from the individual TCH, since the common TCH is a channel that the plurality of mobile terminal devices share and use, the information for discriminating the mobile terminal devices from each other becomes necessary for the common TCH. Accordingly, as shown in FIG. 2, a frame format of the common TCH is formed by a plurality of blocks 500-r (r: 1, 2, 3, . . . ). And, the respective blocks 500-r (r: 1, 2, 3, . . . ) are constructed of a terminal device discriminating section 501 for discriminating the mobile terminal devices and a data section 502 for carrying a voice signal and the information or the like of an adjacent area. The mobile terminal device is constructed so that it determined whether or not the block is a block of its own mobile terminal device based on the information of the terminal device discriminating section 501, and if it is the block of its own mobile terminal device, the information of the data section 502 is analyzed and if it is not the block of its own device, the block is destroyed.

Next, the arrangements of the above-mentioned exchange control station 1, radio base stations 2A and 2B, and mobile terminal device 3 will be explained.

FIG. 3 is a block diagram of the exchange control station 1, the radio base stations 2A and 2B, and the mobile terminal device 3.

The exchange control station 1 has a storage section 13 and detection means 14. The storage section 13 is constructed of a semiconductor memory or a hard disc drive system, and handover control information is stored therein. The detection means 14 is for detecting that the handover control information cannot be transmitted to the mobile terminal device from the radio base station that is a handover source. Particularly, it is detected when a handover completion message cannot be received from the mobile device 3 within a predetermined period of time.

Next, the radio base stations 2A and 2B will be explained. In addition, since the radio base station 2A and the radio base station 2B have the same arrangement, only the radio base station 2A will be explained.

The radio base station 2A has a CTCH generator 8 for generating the above-mentioned spreading code CTCH, a BTS-k generator 9 for generating the spreading codes BTS-k inherent in each radio base station, a multiplier 10 for multiplying the spreading code CTCH generated by the CTCH generator 8 by the spreading codes BTS-k generated by the BTS-k generator 9, and generating a spreading code of the common TCH, and a spreading section 11 for diffusing the handover control information by means of the spreading code=CTCH×BTS-k of the common TCH.

The mobile terminal device 3 has a common conversation channel receiving section (referred to as a common TCH receiving section, hereinafter) 11 for receiving the handover control information by means of the common TCH, and a handover information acquiring section 12 for acquiring the control information of its own mobile terminal device 3 from the control information of the handover, which was received by this common TCH receiving section 11. The handover information acquiring section 12 of the mobile device terminal 3 determines whether or not a block is related to its own device based on the information of the mobile terminal device discriminating section 501, and if it is related to its own device, the information of the data section 502 is analyzed, and the block is skipped over if it is determined that it is not related to.

Next, how the handover is conducted in the CDMA mobile communication system as constructed above will be explained particularly.

FIG. 4 is a sequence view showing an operation of the handover.

First, in case that the mobile terminal device 3 relaying the radio base station 2A and communicating with the exchange control station 1 is moving towards the radio base station 2B, when it comes from behind the obstacle 4, the electric field strength of a radio wave of a pilot channel from the radio base station 2B exceeds a threshold value TA for starting up handover. If it exceeds this threshold value TA, the mobile terminal device 3 transmits a handover request message to the exchange control station 1 by means of the individual TCH (FIG. 4, step 1).

The exchange control station 1 that received the handover request message transmits a conversation channel start-up message to the radio base station 2B for starting up the individual TCH of the radio base station 2B (FIG. 4, step 2).

The radio base station 2B that received the conversation channel start-up message issues a conversation channel start-up affirmation message for notifying the exchange control station 1 of the spreading codes DTCHm to be newly used (FIG. 4, step 3).

For indicating the spreading codes DTCHm to be used in the radio base station 2B that is a handover destination, the exchange control station 1 that received the conversation channel start-up affirmation message transmits a handover direction message to the mobile terminal device 3 using the common TCH of the radio base station 2A that is a handover source and the common TCH of the radio base station 2B that is a handover destination (FIG. 4, step 4, step 5).

The mobile terminal device 3 that had come from behind the obstacle 4 receives the handover direction message of the common TCH from the radio base station 2B, since the electric field strength of a radio wave originated from the radio base station 2B is stronger than the electric field strength of a radio wave originated from the radio base station 2A (FIG. 4, step 5). At this time, the mobile terminal device is constructed so that it determined whether or not a block is one of its own mobile terminal device based on the information of the terminal device discriminating section 501 of the common TCH, and if it is the block of its own mobile terminal device, the information of the data section 502 is analyzed and if it is not the block of its own device, the block is destroyed.

The mobile terminal device 3 that received the handover direction message issues a handover completion message by means of the individual TCH (FIG. 4, step 6).

The radio base station 2B or the radio base station 2A receives the handover completion message, and transmits the handover completion message to the exchange control station 1 (FIG. 4, step 6, step 7).

As explained above, even under circumstances such that the electric field strength of a radio wave originated from the radio base station that is a handover source becomes weaker due to the obstacle 4 or the like, by providing the CDMA mobile communication system with the common TCH, it is possible to increase a success rate of the handover.

Also, by dividing a block into a plurality of blocks and making the respective blocks have information for discriminating the mobile terminal devices so that the common TCH can be used in common by the plurality of mobile terminal devices, it is possible to promote efficient utilization of the spreading codes.

Further, since the message for giving instructions of the handover to the mobile terminal device 3 is not transmitted only from the radio base station 2A that is a handover source and the radio base station 2B that is a handover destination, the interference of the radio circuit can be reduced.

Another embodiment of the present invention will be explained.

With regard to a feature of another embodiment, it is characterized in that, after the exchange control station 1 understands that, due to the obstacle 4 or the like, the spreading code information to be newly used cannot be sent to the mobile terminal device 3 from the handover source by means of the individual TCH, it is transmitted again by means of the common TCH. The exchange control station 1 dose not have to conduct the transmission by means of the common TCH even in case that the spreading codes to be newly used can be sent to the mobile terminal device 3 from the handover source by means of the individual TCH, and the interference of the down-radio circuit can be reduced.

A particular operation will be explained below.

FIG. 5 and FIG. 6 are sequence views showing an operation of handover, which is another embodiment.

In case that the mobile terminal device 3 relaying the radio base station 2A and communicating with the exchange control station 1 is moving towards the radio base station 2B, when it comes from behind the obstacle 4, the electric field strength of a radio wave of a pilot channel originated from the radio base station 2B exceeds a threshold value TA for starting up handover. If it exceeds this threshold value, the mobile terminal device 3 transmits a handover request message to the exchange control station 1 by means of the individual TCH of the radio base station 2A (FIG. 5, step 1).

The exchange control station 1 that received the handover request message transmits a conversation channel start-up message for starting up the individual TCH of the radio base station 2B (FIG. 5, step 2).

The radio base station 2B that received the conversation channel start-up message issues a conversation channel start-up affirmation message for notifying the exchange control station 1 of the spreading codes DTCHm that can be newly used (FIG. 5, step 3).

For indicating to the mobile terminal device 3 the spreading codes DTCHm to be used in the radio base station 2B that is a handover destination, first, the exchange control station 1 that received the conversation channel start-up affirmation message transmits a handover direction message to the mobile terminal device 3 using the individual TCH of the radio base station 2A that is a handover source (FIG. 5, step 4).

Here, the mobile terminal device 3 is hiding behind the obstacle 4 and cannot receive the handover direction message, and in case that the exchange control station 1 cannot receive the handover completion message from the mobile terminal device 3 within a predetermined period of time, it is detected by the detection section 13 of the exchange control station 1 that the handover direction message cannot be transmitted to the mobile device 3 using the individual TCH of the radio base station 2A. Then, for indicating the spreading codes DTCHm to be used in the radio base station 2B that is a handover destination, the exchange control station 1 transmits the handover direction message to the mobile terminal device 3 using the common TCH of the radio base station 2A that is a handover source and the common TCH of the radio base station 2B that is a handover destination (FIG. 5, step 5, step 6).

The mobile device 3 that has come from behind the obstacle 4 receives the handover direction message of the common TCH from the radio base station 2B, since the electric field strength of a radio wave from the radio base station 2B is stronger than the electric field strength of a radio wave from the radio base station 2A (FIG. 5, step 7).

The mobile terminal device 3 that received the handover direction message issues a handover completion message by means of the individual TCH (FIG. 5, step 8).

As mentioned above, the common TCH is not used in case that the information necessary for the handover can be transmitted by means of the individual TCH, and the common TCH is used in case that a response by means of the individual TCH fails, and thereby, the interference of the down-radio circuit can be reduced.

According to the present invention, even under circumstances such that the electric field strength of a radio wave originated from the radio base station that is a handover source becomes weaker than the electric field strength of a radio wave originated from the radio base station that is a handover destination due to the influence of the obstacle or the like, it is possible to increase a success rate of the handover.

What is claimed is:

1. A handover method in a code division multiple access communication system, the method comprising:
   transmitting control information of handover by using a first common channel generated by means of a spreading code that is a product of a code inherent in a radio base station of a handover source and a code common to all radio base stations, and a second common channel generated by means of a spreading code that is a product of a code inherent in a radio base station of a handover destination and the code common to all radio base stations.

2. The handover method in a code division multiple access communication system recited in claim 1, characterized in that a code inherent in an adjacent radio base station is transmitted by a report channel to a mobile terminal which is not communicating.

3. The handover method in a code division multiple access communication system recited in claim 1, characterized in that a code inherent in an adjacent radio base station is transmitted by an individual communication channel.

4. A handover method in a code division multiple access communication system, the method comprising:
   transmitting control information of handover by using a common channel generated by means of a spreading code that is a product of a code inherent in every radio base station and a code common to all radio base stations;
   wherein a frame comprising a mobile terminal discriminating information section for discriminating mobile terminals from each other and a data section for a mobile terminal specified by the mobile terminal discriminating information is transmitted via the common channel.

5. A handover method in a code division multiple access communication system, the method comprising:
   transmitting control information of handover by using a common channel generated by means of a spreading code that is a product of a code inherent in every radio base station and a code common to all radio base stations;
   wherein the control information of handover is transmitted by using the common channel only in case that there is no response from a mobile terminal to control information of handover, which was transmitted via an individual communication channel.

6. A handover method in a code division multiple access communication system, comprising the steps of:
   in response to handover from a mobile terminal, generating handover control information comprising mobile terminal discriminating information for discriminating said mobile terminal and a data necessary for the handover of said mobile terminal;
   transmitting said handover control information by using a first common channel generated by means of a spreading code that is a product of a code inherent in a radio base station of a handover source and a code common to all radio base stations, and a second common channel generated by means of a spreading code that is a product of a code inherent in a radio base station of a handover destination and the code common to all radio base stations;
   receiving said handover control information from at least one of said first common channel and said second common channel by means of a spreading code that is a product of a code inherent in an adjacent radio base station and a code common to all radio base stations, which is stored in advance, and acquiring said handover control information having said mobile terminal discriminating information of its own mobile terminal out of the received handover control information; and
   transmitting received information of the handover control information to the radio base station of the handover source and/or the radio base station of the handover destination by using an individual communication channel.

7. The handover method in a code division multiple access communication system recited in claim 6, wherein the handover control information is transmitted by using the first and second common channels only in case that there is no response from the mobile terminal to control information of handover, which was transmitted via the individual communication channel.

8. The handover method in a code division multiple access communication system recited in claim 6, characterized in that the code inherent in an adjacent radio base station is transmitted by a report channel to a mobile terminal which is not communicating.

9. The handover method in a code division multiple access communication system recited in claim 6, characterized in that the code inherent in an adjacent radio base station is transmitted by the individual communication channel.

10. A code division multiple access communication system comprising:

means for, in response to handover from a mobile terminal, generating handover control information comprising mobile terminal discriminating information for discriminating said mobile terminal and a data necessary for the handover of said mobile terminal; and means for diffusing said handover control information by means of a spreading code that is a product of a code inherent in every radio base station and a code common to all radio base stations, and transmitting the diffused handover control information by means of a common channel specified by said spreading code;

means for transmitting the handover control information by means of an individual communication channel; and means for transmitting the handover control information by using said common channel only in case that there is no response from the mobile terminal to control information of handover, which was transmitted from said individual communication channel.

11. A code division multiple access communication system comprising:

an exchange station having means for, in response to handover from a mobile terminal, generating handover control information comprising mobile terminal discriminating information for discriminating said mobile terminal and a data necessary for the handover of said mobile terminal;

a radio base station of a handover source, which has means for transmitting the handover control information by using a first common channel generated by means of a spreading code that is a product of a code inherent in the radio base station of the handover source and a code common to all radio base stations;

a radio base station of a handover destination, which has means for transmitting the handover control information by using a second common channel generated by means of a spreading code that is a product of a code inherent in the radio base station of the handover destination and the code common to all radio base stations;

means for receiving, at the mobile terminal, the handover control information from at least one of said first and second common channels by means of a spreading code that is a product of a code inherent in an adjacent radio base station and the code common to all radio base stations, which is stored in advance, and acquiring the handover control information having mobile terminal discriminating information of the mobile terminal out of the received handover control information; and the mobile terminal having means for transmitting the received information of the handover control information to the radio base station of the handover source and/or the radio base station of the handover destination by using an individual communication channel.

12. The code division multiple access communication system recited in claim 11, wherein the exchange station has means for controlling the radio base station of the handover source and the radio base station of the handover destination to transmit the control information of handover by using the first and second common channels only in case that there is no response from the mobile terminal to the handover control information, which was transmitted from the individual communication channel, which is an individual channel of the radio base station of the handover source.

13. The code division multiple access communication system recited in claim 11, further comprising means for transmitting a code inherent in a radio base station to the mobile terminal which is not communicating.

14. The code division multiple access communication system recited in claim 11, further comprising means for transmitting a code inherent in a radio base station by means of the individual communication channel.

* * * * *